United States Patent [19]

Coe et al.

[11] Patent Number: 4,829,799
[45] Date of Patent: May 16, 1989

[54] METHOD OF MANUFACTURING SUBSTRATE FOR MEMORY DISK

[75] Inventors: Thomas U. Coe, Saratoga, Calif.; Atsushi Yamazaki, Tochigi, Japan; Chris Krishnan, San Jose, Calif.

[73] Assignees: Furukawa Aluminum Co., Ltd., Tokyo; Kawasaki Steel Corp., Hyogo; C. Itoh & Co., Ltd., Osaka, all of Japan

[21] Appl. No.: 105,432

[22] PCT Filed: Jan. 25, 1987

[86] PCT No.: PCT/JP87/00005

§ 371 Date: Oct. 27, 1987

§ 102(e) Date: Oct. 27, 1987

[87] PCT Pub. No.: WO87/04095

PCT Pub. Date: Jul. 16, 1987

[30] Foreign Application Priority Data

Dec. 28, 1985 [JP] Japan ................................ 60-297597

[51] Int. Cl.$^4$ ............................................. B21D 53/00
[52] U.S. Cl. ........................................ 72/47; 72/359; 72/379; 360/135
[58] Field of Search ............... 72/47, 335, 336, 352, 72/354, 359, 373, 374, 375, 376, 379, 414; 427/130; 360/135

[56] References Cited

U.S. PATENT DOCUMENTS

| | | | |
|---|---|---|---|
| 2,858,603 | 11/1958 | Hermann | 72/336 |
| 2,972,183 | 2/1961 | Greenshields | 29/DIG. 18 |
| 3,145,455 | 8/1964 | Zaleske | 72/376 |
| 3,196,660 | 7/1965 | Olson | 72/376 |
| 3,761,333 | 9/1973 | Kleinbeck | 360/135 |
| 3,797,035 | 3/1974 | Hunt | 360/135 |
| 3,808,079 | 4/1974 | Akashi | 360/135 X |
| 3,845,651 | 11/1974 | Vau | 72/354 |
| 3,886,052 | 5/1979 | Smith | 360/135 X |
| 4,029,541 | 6/1977 | Barlow | 360/135 X |
| 4,030,138 | 6/1977 | Hilier | 360/135 |
| 4,069,360 | 1/1978 | Yanagisawa | 360/135 X |
| 4,071,360 | 1/1978 | Mannino | 72/376 |
| 4,403,494 | 9/1983 | McCullough | 72/360 |
| 4,430,387 | 2/1984 | Nakagawa | 360/135 X |
| 4,520,647 | 6/1985 | Economy et al. | 72/365 |
| 4,525,759 | 6/1985 | Valayil | 360/135 |
| 4,588,653 | 5/1986 | Wray | 428/600 |
| 4,711,115 | 12/1987 | Sukonnick | 72/329 |

FOREIGN PATENT DOCUMENTS

| | | | |
|---|---|---|---|
| 127523 | 8/1982 | Japan | 72/379 |
| 880529 | 12/1987 | Japan | . |
| 880531 | 12/1987 | Japan | . |

OTHER PUBLICATIONS

IBM Technical Disclosure Bulletin, vol. 23, No. 1, Jun. 1980, p. 306, M. F. Doerner, "Magnetic Recording Disk with High Start/Stop Durability and Low Magnetic Errors".
IBM Technical Disclosure Bulletin, vol. 23, No. 9, Feb. 1981, pp. 4032-4033; A. T. Fletcher; "Diskette Marking".
IBM Technical Disclosure Buletin, vol. 26, No. 3A, Aug. 1983, pp. 1208-1209, W. H. Bachman; "Magnetic Disk Container".
Metals Handbook (1948 ed.), pp. 42-43.

Primary Examiner—Lowell A. Larson
Attorney, Agent, or Firm—Townsend and Townsend

[57] ABSTRACT

A method of manufacturing a substrate for a memory disk characterized in that a blank material comprising a non-magnetic metal substrate covered with a non-magnetic metal as an underlayer is subjected to a coining operation by two dies, i.e. upper and lower dies each having flat compressing surface and a certain kind of textured design formed thereon within an apparatus including a mandrel and a die ring arranged to limit the spreading extent of the material whereby a surface having ultra-preciseness and simultaneously impressed texture design is obtained.

3 Claims, 2 Drawing Sheets

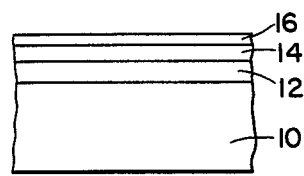
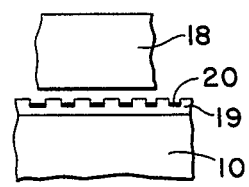
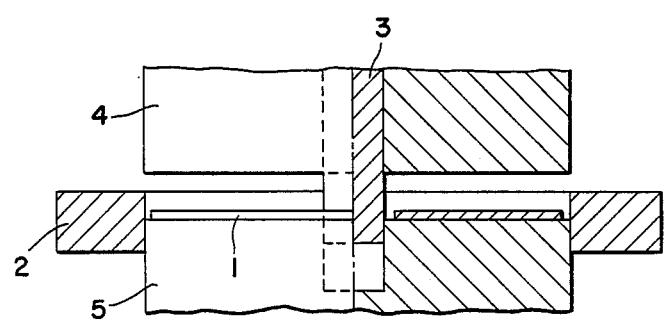

METHOD OF MANUFACTURING SUBSTRATE FOR MEMORY DISK

FIELD OF INVENTION

The present invention relates to a method of economically and ultra-precisely manufacturing substrates for memory disks by performing a coining operation on the surfaces of a non-magnetic metal blank material having a non-magnetic metal coating as an underlayer, and more particularly, to a method of making the surfaces of a blank material very smooth and impressing a certain type of design (texture) on the surface of the blank material Throughout the specification, the term "non-magnetic metallic substrate" is used to identify sheets or plates made of Al, an Al alloy, Cu, a Cu alloy, Mg, a Mg alloy, Ti, a Ti alloy or composites thereof. The term "non-magnetic metal as an underlayer" is used to identify a non-magnetic metal or alloy, a single body of metal such as Cr, etc. and an alloy such as a Ni-P alloy, a Ni-P-Cu alloy, a austenite stainless steel or the like.

PRIOR ART AND PROBLEMS THEREOF

Conventionally, substrates for magnetic memory disks which are used to record and reproduce letters, sounds and images, etc. have been produced by the following method. That is to say, a non-magnetic metal sheet for substrates, such as an aluminum alloy sheet is punched out to produce doughnut shaped blanks and the outer and inner diameters of the blanks are finished to predetermined dimensions with chamfers formed thereat for easy handling Next, such surfaces of the metal blanks for the substrates are ultra-precisely finished (with respect to roughness and undulation, etc.) by such processes as machining by use of a diamond bit, polishing, grinding or combinations thereof.

The metallic substrates finished as above are covered with a non-magnetic metal coating as an underlayer in order to harden the surface thereof The underlayer, if it is coated chemically, is applied by means of plating approximately 20 $\mu$m thickness of a Ni-P alloy or a Ni-P-Cu alloy. Afterwards, the plated surfaces are polished to obtain smooth surfaces A memory disk is made by applying a thin film magnetic media on the surfaces obtained as above and it is further provided with a protective coating as required (refer to FIG. 1).

However, in a flat and high density magnetic memory disk, there is a problem in that a magnetic head is adhered to the surfaces of the disk since the distance between the disk and the head is quite short and the surfaces of the disk add the head are flat It sometimes occurs that the head hits the disk surface, creating the problem of damaging the magnetic coating thereof Furthermore, there is a problem in regard to the magnetic characteristics.

For the reasons stated above, it has been the practice to provide a certain type of design (texture) on the surface of the disk on the underlayer (coated layer) and to apply a magnetic coating over the indented portions (refer to FIG. 2). The texture has conventionally been applied mechanically such as by a machining, or other mechanical methods such as by padding or using a pad or tape bearing grinding particles. As explained above, many operational steps have been required before providing the texture on the underlayer and the prior process thus required many facilities and considerable expenditure of time, thereby lowering productivity. Further, there has been a limitation as regards the texture design patterns that could be employed because they have been applied mechanically by using a pad or tape etc. bearing grinding particles. Further, there has been another drawback in that even when the texture pattern was applied to a plurality of disks under the same conditions, it has not been possible to obtain an identical design on each piece. Also, a rinsing operation was necessary because it was difficult to remove minute fragments generated during the operation of mechanically applying the texture pattern.

As explained above, while a memory disk having a textured surface is favorable in that it has excellent characteristics, there have been many drawbacks in manufacturing the same as well as in attempts to stabilize the quality of the same.

MEANS OF REMOVING DRAWBACKS AND EFFECT OF INVENTION

In view of the drawbacks of the prior art as noted above, the present invention was conceived to provide a method of manufacturing substrates for memory disks by utilizing a coining process offering high productivity and the possibility of stabilizing quality.

The coining operation is a conventional technology for manufacturing metallic currencies and it has been a general practice to form a design having relatively large indentations and protrusions on a surface to be compressed. This invented process is different from a method of reproducing a design that has large indentations and protrusions since it is a method of finishing ultra-precisely and simultaneously the opposite surfaces of a substrate, represented by a blank material coated with a non-magnetic material, by applying a coining pressure on the surfaces with upper and lower compressing dies each compressing surface of which is preliminarily provided with a certain micro-texture design comprising myriad minute lines (width: $\leq 0.5$ $\mu$m, depth: $\leq 0.025$ $\mu$m), circles or triangles etc., the surfaces of the finished products being provided with the relevant design by the coining.

In practice, the manufacturing method of the present invention is carried out by employing coining dies such as those shown in FIG. 3. A blank material (1) covered with a non-magnetic metal as an underlayer is subjected to a coining operation by too dies, namely the top and the bottom dies (4 and 5) within a device comprising a mandrel or core member (3) and a die ring (2) for restricting the spreading of material, each of the compressing surfaces of the dies being provided with a certain kind of lined design (texture) whereby the surfaces of the blank material are precisely finished to have textured designs thereon.

With the operation as above described, it is possible to efficiently produce substrates with stabilized surface quality in large quantities The process of the present invention is different from the conventional mechanical process employed for producing a textured surface and it will not generate minute features, thereby simplifying the manufacturing facilities needed and affording many advantages in terms of quality control and saving of production costs. Further, with respect to the surface quality, it is possible, according to the present invention, to obtain preciseness at the indented and protruded portions (texture) of the substrate surface, and the coined surface may be directly coated with a magnetic substance without pre-polishing. Regarding such aspects of quality as absence of undulation, etc. in the disk, the method of the present invention is able to provide disks of a quality equivalent to or better than that of products produced by the conventional machining process using a diamond bit.

A blank material as herein referred to may be made of a non-magnetic metal substrate material (Al, an Al alloy Cu, a Cu alloy, Mg, a Mg alloy, Ti, a Ti alloy or a composite thereof) which is rolled to exhibit relatively good surface preciseness (surface roughness Ra 0.10 $\mu$m-0.40 $\mu$m) and plated with an underlayer without machining or grinding, the plating being a direct chemical plating (for instance, plating such as Ni-P, or Ni-P-Cu, etc.) or a direct physical plating (for instance, a vapor-deposition, ion-plating or sputtering, such as sputtering of Cr, or Ni-P, etc.) Also a clad sheet may be used which is made of a non-magnetic metal thin sheet clad with an austenite stainless steel by rolling.

The prescribed layer can be covered with a chemical plating or physical plating, and the metal substrate in the form of a sheet or strip can be preliminarily covered with a chemical plating or physical plating or clad rolling prior to being blanked out into a doughnut-like shape.

A blank material subjected to the coining operation according to the present invention may either be one which is chemically plated or physically plated after being punched to form a doughnut-like shape or one which is punched to a doughnut-like shape from a metal sheet or web covered with a chemical plating, a physical plating or a clad rolling.

According to the invented process, it is possible to obtain an ultra precise surface finish which is at least equivalent to, or better than, a normal process just by performing one coining operation over the underlayer According to the present invention, it is possible t produce an ultra-precise surface on an underlayer of a blank material by a single coining operation on the underlayer and the quality of the coined surface with a textured finish obtained is better than that obtained in the conventional method.

Also, according to the present invention, it is possible to use a metal blank which is made by directly applying an underlayer on a metal substrate by a chemical plating, a physical plating or clad rolling without any preliminary machining, grinding or polishing, whereby the conventional steps of machining, grinding and polishing can be omitted.

Further, the polishing step after the plating which has been required in the conventional method may be omitted.

As explained above, it has been made possible to eliminate a lot of operational steps, to simplify the manufacturing steps and to reduce the number of facilities required whereby the present invention contributes to the possibility of providing a high production rate for manufacturing substrates for memory disks as well as eliminating problems in handling.

While in the foregoing, it has been explained that a relatively precisely rolled metal substrate on which an underlayer of a non-magnetic metal is applied by a chemical or physical plating may be used as a blank material in the present invention, it is also possible to use a metal substrate on which machining, grinding and polishing have been performed to a slight extent to a quality grade lower than that needed in the conventional one and an underlayer is applied by means of a chemical plating or physical plating.

In the present invention, a surface of a blank material is impressed with a condition of a compressing surface of a die together with being slightly worked under a state of plasticity. Therefore, a die is used that has an ultra-precisely finished compressing surface It is preferable to arrange the coining pressure to be applied on the blank below 5 times the tensile strength of the metal substrate material and the sheet gauge reduction ratio below 4% of the total thickness of the sheet.

Also, it is preferable to coat lubricant on the surface of the blank material from the viewpoint of preventing "build-up". Further, it is preferable to arrange the clearances between the blank material and the die ring and between the blank material and the mandrel to be approximately 0.5% of the inner diameter of the ring and the outer diameter of the ring, respectively.

In the manner describe above, it is possible to ultraprecisely finish the surface of a blank material having an underlayer by performing a coining operation thereon such as to achieve a quality equal to or better than that obtained in the conventional process.

The reason why the blank material is coined within a combination of a mandrel and a ring adapted to restrict spreading of material is that the state of the precisely finished surface of a die is easily transferred to the coined product by restricting the flow of the material whereby the formed products are obtained with superior quality with respect to surface roughness. Further, the coining operation performed as above is capable of providing products having good accuracy wit respect to their inner and outer diameters.

Also, in the present invention, it is effective to use a kiss-ring in order to prevent tilting of a die surface so that the thickness of the products is stably maintained and the quality of the products is minimally affected by the maintenance degree of the pressing equipment employed.

The type of texture design to be transferred onto the surface of a substrate may be any of such patterns as ones comprising concentric circles, radial lines, cross hatched lines, or random designs composed of lines or the like, the texture design being preformed on a compressing surface of each of the dies employed Alternatively, a certain design (such as orange peel like, circles, triangles or squares) may also be used.

The designs shown in FIGS. 4 and 5 are only examples of repetitive designs and several other designs such as those referred to above may be considered.

Of course, the patterns indicated in FIGS. 4 and 5 are provided over the whole of the surface.

FIG. 6 shows an explanatory and enlarged cross sectional view of a product made by coining a clad material (raw material) using an apparatus such as that shown in FIG. 3.

BRIEF EXPLANATION OF DRAWINGS

FIG. 1 is a sectional view of a magnetic disk wherein the surface of its substrate is flat;

FIG. 2 is a sectional view of a magnetic disk wherein a substrate thereof has a texture design applied thereto;

FIG. 3 is an explanatory drawing showing an apparatus for use with a method of manufacturing a memory disk according to the present invention;

EMBODIMENTS

Figure 4:
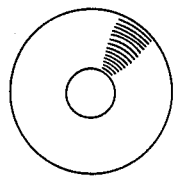
FIG. 4 shows a texture pattern of concentric circles relating to the present invention.

Firstly, a blank material with a doughnut-like shape (inner diameter: 25.126 mm$\phi$; outer diameter 94.527 mm$\phi$) was made from 5086-0 Aluminum alloy sheet (Al-Mg Alloy thickness 1.2 mm). The surface roughness (Ra) was 0.20 $\mu$m. The blank material was arranged to have its inner diameter slightly larger and its outer diameter slightly smaller than those of the ring and the mandrel, respectively (inner diameter of the test ring: 95 mm$\phi$, outer diameter of the madrel: 25 mm$\phi$). The surface of this blank was directly plated with a Ni-P layer without being ground or polished so that the thickness of the plating was 20$\mu$m. This blank is employed as a raw material to be coined. Also the compressing surfaces of the dies were provided with textured finishes as shown in FIG. 4 (Embodiment 1) and FIG. 5 (Embodiment 2) by machining operations.

The blank materials above described were coined by a coining apparatus of the type shown in FIG. 3 and coined products were obtained The coining pressure was arranged to be approx. 4 times the tensile strength of the base sheet of the blank material The total sheet gauge reduction ratio was approx. 1.1%. The lubricant G6311 (Viscosity: 1.01; 30° C. cst, oil film strength: 10 kg/cm:) produced by Nippon Machining Oil Co. was used.

Ten sheets of the samples produced were measured, the surface roughness Ra being measured by a surface roughness meter and the values for TIR and acceleration were measured by RVA.

Figure 5:
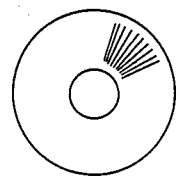
FIG. 5 shows a texture pattern of radial lines relating to the present invention.
Figure 6:
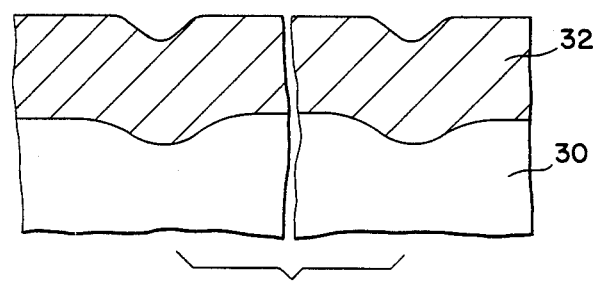
FIG. 6 is an enlarged sectional view of a product after a blank has been coined 1: blank material
2: ring,
3: mandrel,
4, 5: die

The results are shown in Table 1 the values for this embodiment being the mean values obtained from the 10 coined products. The illustration shown in FIG. 4 is a group of concentric circles and corresponds to Example 1 noted below, the width of the lines being 0.1 $\mu$m, the depth thereof 0.01 $\mu$m and the spacing therebetween 0.5 $\mu$m. The illustration shown in FIG. 5 is a pattern comprising radial lines each having a width of 0.1 $\mu$m, a depth of 0.01 $\mu$m and a spacing of 0.5 degrees.

Incidentally, the surface roughness Ra is the maximum value measured in randomly selected directions.

TABLE 1

| | Surface roughness Ra ($\mu$m) | TIR ($\mu$m) | Acceleration ratio (m/sec$^2$) |
|---|---|---|---|
| Embodiment 1 | 0.012 | 14.8 | 9.97 |
| Embodiment 2 | 0.011 | 14.6 | 9.94 |
| Conventional Process (SEMI Spec.) | less than 0.025 | less than 30.0 | less than 11.4 |

Evaluation was also performed in respect of qualities required of a memory disk (for instance, parallelism, minute undulation, complete roundness and concentricity). In respect of all these values, it was confirmed that the results were at least equivalent to or better than the values obtained in the conventional process.

EFFECTS OF INVENTION

As explained above, since the opposite surfaces of a substrate for a memory disk are worked simultaneously in high precision by a coining operation using a press in the present invention, it is advantageous in reducing the number of operational steps and in achieving a high production rate.

Further, as compared to the conventional method, a substrate for a memory disk can be economically supplied which is equivalent to or better in quality than that of the prior art.

We claim:

1. A method of manufacturing a substrate for a memory disk characterized in that a blank material comprising a non-magnetic metal substrate covered by plating with a non-magnetic metal as an underlayer is subjected to a coining operation by two dies, e.g., upper and lower dies each having a flat compressing surface and a certain kind of textured design formed thereon within an apparatus including a mandrel and a die ring arranged to limit the spreading extent of the material whereby a surface having ultra-preciseness an simultaneously impressed texture design is obtained without mechanical surface finishing before and after the coining operation.

2. A manufacturing method as claimed in claim 1 wherein a blank material on which a covering of a non-magnetic metal that is provided by a chemical plating is employed.

3. A manufacturing method as claimed in claim 1 wherein a blank material on which a covering of a non-magnetic metal that is provided by a physical plating is employed.

* * * * *

UNITED STATES PATENT AND TRADEMARK OFFICE
CERTIFICATE OF CORRECTION

PATENT NO. : 4,829,799

DATED : May 16, 1989

INVENTOR(S) : Coe et al.

It is certified that error appears in the above-identified patent and that said Letters Patent is hereby corrected as shown below:

Title page, item [22], change
 PCT Filed: Jan. 25, 1987" to -- [22] PCT Filed: Jan. 5, 1987--.

Signed and Sealed this

Fourteenth Day of September, 1993

Attest:

BRUCE LEHMAN

*Attesting Officer*   *Commissioner of Patents and Trademarks*